Figure 1:
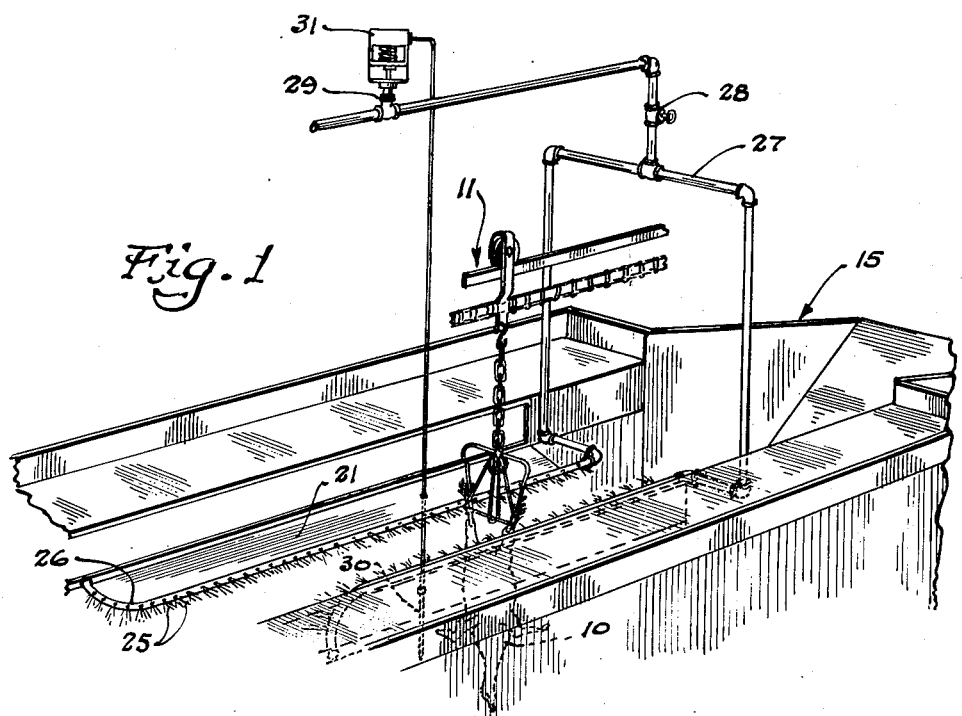

Feb. 2, 1954

H. J. LONG 2,667,661

METHOD OF SCALDING POULTRY

Filed Aug. 1, 1950

INVENTOR.
Harry J. Long
BY
R. L. Story
ATTORNEY

Patented Feb. 2, 1954

2,667,661

UNITED STATES PATENT OFFICE 2,667,661

METHOD OF SCALDING POULTRY

Harry J. Long, Chicago, Ill., assignor to Swift & Company, Chicago, Ill., a corporation of Illinois Application August 1, 1950, Serial No. 176,994

5 Claims. (Cl. 17—45)

The present invention relates to a method for facilitating the defeathering of fowl.

It has long been the practice to scald poultry by dipping the birds in hot water before attempting to pick the feathers therefrom. In commercial operations, this is commonly performed by attaching a clamp to the legs of the birds and moving the clamp and bird supported thereby along a given path by means of an overhead conveyor, which path intersects a scalding tank through which the birds are dragged. The length of time that the bird remains in the scalding tank is determined by the speed of the conveyor. The amount of scalding (controlled through the scalding temperature and immersion time) is at best a compromise. The more the birds are scalded, the more easily may the feathers be removed therefrom. However, if the birds are scalded for too long a period, the rubber fingers of the mechanical pickers used in the defeathering will "bark" or otherwise spoil the appearance of the skin and result in a less saleable product.

When sufficiently reduced scalding times are used to eliminate the barking problem, the feathers about the legs of the birds, particularly those in what is referred to as the garter area, become difficult to remove. This results in the necessary expenditure of additional time and labor in removing the feathers from these portions of the birds. The present method has for its principal object the scalding of the legs of the birds at a higher temperature than the bodies of the birds to decrease the difficulty involved in picking the feathers from the legs. A particular feature of this invention is that the dual scalding may occur simultaneously and the legs will be scalded at a higher temperature than that to which the body is subjected.

This is achieved by applying a steam and water mixture to the legs in such a manner that it is tempered before reaching the bodies of the birds. In the instant method, the bodies are immersed in a fluid of a lower temperature than that of the aforesaid mixture which is applied to the legs. Such immersion acts as a blanket in protecting the bodies from that mixture. This feature of the present invention permits the selective scalding of the various portions of the birds so that the feathers all may be easily removed by mechanical pickers while, at the same time, no parts are overscalded to an extent which would result in barking of the birds during the mechanical picking.

An additional advantage of the present invention is that it may be readily applied to the more common types of existing installations without any expensive alterations therein. Not only is the cost of the modernization a small matter, but the substantial investment in the present scalding equipment and associated mechanism is not lost.

Figure 2:
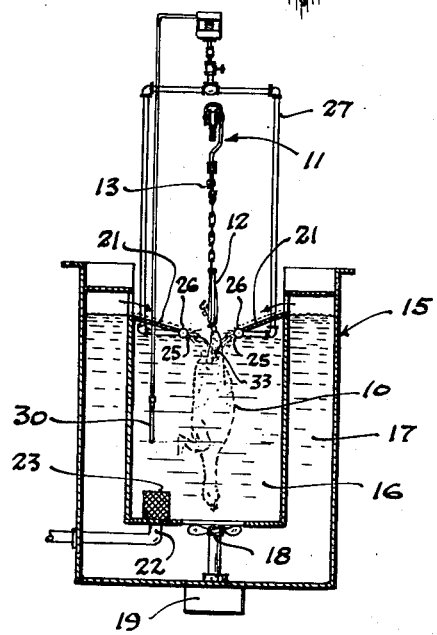

Additional objects and advantages will become apparent from the following description taken in conjunction with the drawings, in which:

Fig. 1 is a perspective view of a poultry scalding tank embodying my invention; and Fig. 2 is a transverse section through the scalding tank of Fig. 1.

The birds 10 which are to be scalded and picked are carried along the processing line by means of an overhead conveyor, generally 11. Clamps or holders 12 are attached to the legs of the birds, and the holders and birds are supported from the conveyor 11 by means of a chain 13. A scalding tank, generally 15, is positioned to intersect the path of movement of the birds along the processing line. The tank is adapted to hold the hot water used in the scalding of the bodies of the birds.

As seen particularly in Fig. 2, the tank includes an inner and outer chamber 16 and 17 respectively. A pump 18 driven by a motor 19 draws the water from inner chamber 16 through an opening in the bottom thereof and discharges the water into the outer chamber 17. The force of the pump drives the water drawn from the inner chamber up along the walls forming the sides of the outer chamber, and the water flows down over the top of plates or shelves 21 which project inwardly adjacent the top of the tank.

A drain 22 covered by a screen 23 is used to continuously withdraw a portion of the water from the tank. Suitable feed means (not shown) may be used to replenish the water in the tank and to maintain it at approximately the level of plates 21.

Along the inwardly-projecting edge of plates 21 are a plurality of steam jets 25, which, in the illustrated embodiment, take the form of one-sixteenth inch holes in a one inch pipe 26, the holes being spaced approximately one inch apart. The holes are positioned in the pipe so as to direct the steam into the tank at a downwardly-projecting angle.

Pipes 26 are connected to a suitable source of steam supply through pipes 27. A hand-control valve 28 is included in line 27 to normally regulate the flow of the steam as desired. A thermostatically-regulated control valve 29 is also included in line 27 with a thermo-responsive element 30 being positioned in the water in chamber 16 adjacent pump 18. In a manner well known in the art, the thermo-responsive element 30 actuates a valve operator 31 to control the setting of valve 29.

The rush of water down over the top of plates 21 from chamber 17 produces a concavity in the water in chamber 16 adjacent the legs 33 of birds 10. At the same time this flow of water blankets the steam issuing from jets 25 in pipe 26, mixes with the steam, and tempers the action thereof. This mixture of steam and water splashes over the legs of the birds, and inasmuch as the mixture is at a higher temperature than the water due to the influx of the steam, the legs receive a higher temperature scald than do the bodies of the birds which are immersed in the water in the tank. The turbulence of the inflow of water and mixed steam, coupled with the fact that it is driven into the water already existing in chamber 16, rapidly takes the heat out of the steam and tempers it so that as it reaches the bodies of the birds it is little warmer than the general temperature of the water within chamber 16. As it will be seen, the water within chamber 16 acts as a buffer to protect the bodies of the birds 10 against the effect of the steam issuing from jets 25.

Thermostatically-regulated valve 29 maintains a given relationship between the steam issuing from the jets and the temperature of the water in the tanks. As the temperature of the water in the tanks drops, the amount of steam issuing is increased so that the leg areas (which are difficult to pick) are given a slightly extra dose of concentrated heat to make up for that which was not received from the water in the tank generally, and this extra steam also gradually brings the temperature of the water in the tank up to the desired operating point.

If the temperature in the water increases above the optimum temperature, there is less need for extra scalding of the legs and the steam flow is reduced. The reduction in the flow of the steam in this period of time adds less heat to the water, bringing the temperature of the water to the desired operating point. Under certain conditions it may be desired to eliminate this thermostatic control and, in such cases, mechanical valve 28 may be used to adjust the flow of steam into the tank.

After scalding, the birds may be picked by means of a mechanical picker, as for example that described in U. S. Patent No. 2,469,953, issued May 10, 1949.

The foregoing description of a specific embodiment is for the purpose of complying with 35 U. S. C. 112 and should not be construed as imposing any unnecessary limitations on the appended claims. Various modifications will be apparent to those skilled in the art without departing from the spirit of the invention.

I claim:

1. A method of processing poultry in preparation for the picking of the feathers therefrom, including the steps of subjecting the bodies of the birds to a heated fluid and simultaneously subjecting the legs of the birds to a higher temperature fluid than that to which the bodies are subjected.

2. A method of processing poultry in preparation for the picking of the feathers therefrom, including the steps of supporting the birds by the legs thereof, immersing the bodies into a heated liquid and simultaneously dousing the legs of the birds with a mixture of said heated liquid and a fluid having a temperature above that of the liquid.

3. A method of processing poultry in preparation for the picking of the feathers therefrom, including the steps of supporting the birds by the legs thereof, immersing the bodies into a hot water bath with the legs at least partially projecting above the surface of said bath, and simultaneously dousing the legs of the birds with a mixture of said heated water and steam.

4. A method of processing poultry in series for the picking of the feathers therefrom, including the steps of supporting the individual birds by the legs thereof, consecutively immersing the bodies into a hot water bath, simultaneously dousing the legs of the birds with a mixture of water and steam, and controlling the temperature of said mixture inversely with the temperature of the water bath.

5. A method of processing poultry in preparation for the picking of the feathers therefrom by means of a mechanical picker, including the steps of supporting the birds by the legs thereof, immersing the bodies into a hot water bath with the legs projecting above the surface of said bath, and simultaneously dousing the legs of the birds with a mixture of said heated water and steam.

HARRY J. LONG.

References Cited in the file of this patent
UNITED STATES PATENTS

| Number | Name | Date |
|---|---|---|
| 1,672,555 | Barker et al. | June 5, 1928 |
| 1,730,964 | Barker et al. | Oct. 8, 1929 |
| 1,770,565 | Anderson | July 15, 1930 |
| 2,381,044 | Franz | Aug. 7, 1945 |